United States Patent
Liu et al.

(10) Patent No.: US 11,382,152 B2
(45) Date of Patent: Jul. 5, 2022

(54) METHOD AND DEVICE FOR CONFIGURING GTP TRANSMISSION CHANNEL AND STORAGE MEDIUM

(71) Applicant: ZTE CORPORATION, Guangdong (CN)

(72) Inventors: Yang Liu, Shenzhen (CN); Yin Gao, Shenzhen (CN); He Huang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/534,378

(22) Filed: Aug. 7, 2019

(65) Prior Publication Data

US 2020/0100304 A1  Mar. 26, 2020

Related U.S. Application Data

(63) Continuation of application No. PCT/CN2017/118661, filed on Dec. 26, 2017.

(30) Foreign Application Priority Data

Feb. 10, 2017  (CN) .......................... 201710074464.0

(51) Int. Cl.
*H04W 76/12*  (2018.01)
*H04W 76/11*  (2018.01)
(Continued)

(52) U.S. Cl.
CPC ....... *H04W 76/12* (2018.02); *H04W 28/0268* (2013.01); *H04W 76/11* (2018.02); *H04W 92/045* (2013.01)

(58) Field of Classification Search
CPC . H04W 28/0268; H04W 76/10; H04W 76/11; H04W 76/12; H04W 92/04; H04W 92/045
See application file for complete search history.

(56) References Cited

U.S. PATENT DOCUMENTS

2015/0359019 A1* 12/2015 Chen ..................... H04W 76/12
                                                 370/329

FOREIGN PATENT DOCUMENTS

CN  101091401 A  12/2007
CN  106162730 A  11/2016
(Continued)

OTHER PUBLICATIONS

Intel (3GPP TSG RAN WG3 Meeting #92 R3-161075 Nanjing, China, Apr. 23-27, 2016 (Year: 2016).*
(Continued)

*Primary Examiner* — Zhensheng Zhang
(74) *Attorney, Agent, or Firm* — Foley & Lardner LLP

(57) ABSTRACT

The present disclosure discloses a method for configuring a General Packet Radio Service Tunneling Protocol (GTP) transmission channel, including: acquiring, by a User Plane Centralized Unit (CU-U) responsible for user plane data in a first network element, session related information through an Xn interface, where the Xn interface is an interface between the CU-U and a Control Plane Centralized Unit (CU-C) responsible for control plane data in the first network element; performing a GTP transmission channel configuration by using the session related information; transmitting first related information of a local GTP transmission channel configuration to a second network element; and receiving second related information of a GTP transmission channel configuration transmitted by the second network element. The present disclosure also discloses an apparatus for configuring a GTP transmission channel.

8 Claims, 7 Drawing Sheets

(51) Int. Cl.
*H04W 28/02* (2009.01)
*H04W 92/04* (2009.01)

(56) References Cited

FOREIGN PATENT DOCUMENTS

| CN | 110248382 B | * | 9/2020 | ............ H04W 28/24 |
|---|---|---|---|---|
| EP | 2 947 950 A2 | | 11/2015 | |
| WO | WO-2010/135628 A2 | | 11/2010 | |
| WO | WO-2014/054200 A1 | | 4/2014 | |
| WO | WO-2018/009340 A1 | | 1/2018 | |

OTHER PUBLICATIONS

International Search Report and Written Opinion for International Appl. No. PCT/CN2017/118661, dated Feb. 24, 2018.
ZTE, China Telecom, "Discussion on the higher layer CU/DU function splits," 3GPP TSG RAN WG3 Meeting #95, R3-170595, Athens, Greece, Feb. 13-17, 2017.
Extended European Search Report on EP 1 789 6123.1 dated Dec. 17, 2019 (6 pages).
CATT: "TP for the protocol stack and functions of CU/DU interface" 3GPP TSG RAN WG2 Meeting #95; R3-170383; Feb. 17, 2017; Athens, Greece (12 pages).
First Office Action for JP Appl. No. 16/534378 dated Dec. 14, 2020 (with English Translation, 8 pages).
Extended European Search Report for EP Appl. No. 17896123.1, dated Jul. 28, 2021 (4 pages).

* cited by examiner

METHOD AND DEVICE FOR CONFIGURING GTP TRANSMISSION CHANNEL AND STORAGE MEDIUM

CROSS REFERENCE TO RELATED APPLICATIONS

The present application claims the benefit of priority under 35 U.S.C. § 120 as a continuation of PCT Patent Application No. PCT/CN2017/118661, filed on Dec. 26, 2017, which claims priority to Chinese Patent Application No. 201710074464.0, filed on Feb. 10, 2017, the entire content of each of which is incorporated herein by reference in its entirety.

TECHNICAL FIELD

The present disclosure relates to the field of wireless communications, and in particular, to a method and apparatus for configuring a GPRS Tunneling Protocol (GTP) transmission channel, and a storage medium.

BACKGROUND

In the Fifth Generation (5G) mobile communication system, a large number of connections and higher rate requirements of users pose a great challenge for the transmission capacity of the fronthaul interface, i.e., the Common Public Radio Interface (CPRI), between the Base Station Processing Unit (BBU) and the Remote Radio Unit (RRU) in the Long Term Evolution (LTE) system. Since the CPRI transmits IQ signals subjected to processing of physical layer coded modulation and the like, the CPRI has higher requirements on transmission delay and bandwidth.

When the 5G air interface rate is increased to tens of Gbps, the traffic demand of the CPRI required to be upgraded to the Tbps level, which puts tremendous pressure on network deployment costs and deployment difficulty. Therefore, in the 5G system, it is beneficial to redefine a division mode of the fronthaul interface. During division of the fronthaul interface, it is to be considered from several aspects of—the transmission capacity, transmission delay, easy deployment and the like. For example, during the non-ideal fronthaul transmission, a first network element (for example a Centralized Unit (CU)) is endowed with a delay-insensitive network function, and a second network element (for example a Distributed Unit (DU)) is endowed with a delay-sensitive network function. As shown in FIG. 1, the first network element and the second network element are transmitted through an ideal and/or non-ideal fronthaul interface, the interface is called a forward interface.

A first protocol entity (such as a Radio Resource Control (RRC) entity) may be located in the first network element. The first protocol entity generates control signaling, maintains at least one of establishment, modification, and release of a radio bearer, and maintains update of a second protocol entity, a third protocol entity, a fourth protocol entity, and physical layer parameters. The function of the second protocol entity is similar to the Packet Data Convergence Protocol (PDCP) function of an LTE system and enhancement thereof, and a user may define multiple PDCP entities, and may configure each PDCP entity carrying user plane data. Each PDCP entity carries data of one radio bearer, and the PDCP entity corresponds to a control plane or a user plane according to different data carried by the radio bearer. The function of the third protocol entity is similar to the Radio Link Control (RLC) function of the LTE system and enhancement thereof. The function of the fourth protocol entity is similar to the Media Access Control (MAC) function of the LTE system and enhancement thereof. The second network element includes at least one of the following: the second protocol entity, the third protocol entity, the fourth protocol entity, a Physical Layer (PHY), and a Radio Frequency Unit (RF). The first network element communicates with the second network element through the fronthaul interface, and the possible functional division of the CU-DU split is as shown in FIG. 2.

In practical application, for option 2 of the function shown in FIG. 2, as shown in FIG. 3, there is another possibility that the control plane PDCP entity and the user plane PDCP entity in the CU are separated, that is, two PDCPs responsible for the user plane and the control plane are located in two different CUs, respectively. For the sake of description, the two CUs are respectively referred to as a User Plane Centralized Unit (CU-U) and a Control Plane Centralized Unit (CU-C), thereby realizing split of control plane data from user plane data.

An Xn interface exists between the CU-C and the CU-U. A forward interface NGx exists between the CU and the DU. The interface between the CU-C and the DU is called NGx-C, and the interface between the CU-U and the DU is called NGx-U.

SUMMARY

Embodiments of the present disclosure provide a method and apparatus for configuring a GTP transmission channel, and a storage medium.

The technical solutions of the embodiments of the present disclosure are implemented as follows.

An embodiment of the present disclosure provides a method for configuring a GTP transmission channel. The method includes: acquiring session related information through an Xn interface, where the Xn interface being used for interaction between a CU-U responsible for user plane data in a first network element and a CU-C responsible for control plane data in the first network element; performing a GTP transmission channel configuration by using the session related information; transmitting first related information of a local GTP transmission channel configuration to a second network element; and receiving second related information of a GTP transmission channel configuration transmitted by the second network element.

In the foregoing solution, the acquired session related information is session related information in the session establishment process. The step of performing a GTP transmission channel configuration by using the session related information includes: performing user plane configuration by using the session related information. The first related information is GTP transmission channel configuration information transmitted by local user plane data. The second related information is GTP transmission channel configuration information transmitted by local user plane data of the second network element corresponding to the first related information.

In the foregoing solution, the acquired session related information is session related information in the session modification process. The step of performing a GTP transmission channel configuration by using the session related information includes: modifying the user plane configuration by using the session related information. Correspondingly, the first related information is GTP transmission channel configuration modification information transmitted by the local user plane data, and the second related information is GTP transmission channel configuration modification information transmitted by the local user plane data of the second network element corresponding to the first related information.

In the foregoing solution, the acquired session related information is session related information in the session deletion process. The step of performing a GTP transmission channel configuration by using the session related information includes: deleting a GTP transmission channel configuration by using the session related information. Correspondingly, the first related information is GTP transmission channel configuration deletion information transmitted by the local user plane data, and the second related information is GTP transmission channel configuration deletion acknowledgement information transmitted by the local user plane data of the second network element corresponding to the first related information.

In the foregoing solution, the step of transmitting first related information of a local GTP transmission channel configuration to a second network element includes: directly sending the first related information to the second network element. Correspondingly, the step of receiving second related information of the GTP transmission channel configuration transmitted by the second network element includes: receiving the second related information directly sent by the second network element.

In the foregoing solution, the step of transmitting first related information of a local GTP transmission channel configuration to a second network element includes: forwarding the first related information to the second network element through the CU-C. Correspondingly, the step of receiving second related information of the GTP transmission channel configuration transmitted by the second network element includes: receiving the second related information sent by the second network element and forwarded by the CU-C.

An embodiment of the present disclosure also provides a GTP transmission channel configuration method, including: acquiring session related information from a core network; and sending the session related information to a CU-U responsible for user plane data in a first network element through an Xn interface, where the session related information is used by the CU-U to perform a GTP transmission channel configuration, and the Xn interface is used for interaction between the CU-U and a CU-C responsible for control plane data in the first network element.

In the foregoing solution, the step of acquiring session related information from a core network includes: acquiring the session related information from a core network through an NG interface, where the NG interface is used for interaction between the CU-C and the core network.

In the foregoing solution, the method further includes: receiving first related information of a local GTP transmission channel configuration of the CU-U sent by the CU-U, and forwarding the first related information to a second network element; and receiving second related information of a local GTP transmission channel configuration of the second network element sent by the second network element, and forwarding the second related information to the CU-U.

An embodiment of the present disclosure provides an apparatus for configuring a GTP transmission channel. The apparatus includes: a first acquiring unit, a configuration unit and a transmission unit.

The first acquiring unit is configured to acquire session related information through an Xn interface, the Xn interface being used for interaction between a CU-U responsible for user plane data in a first network element and a CU-C responsible for control plane data in the first network element.

The configuration unit is configured to perform a GTP transmission channel configuration by using the session related information.

The transmission unit is configured to transmit first related information of a local GTP transmission channel configuration to a second network element, and receive second related information of a GTP transmission channel configuration transmitted by the second network element.

In the foregoing solution, the acquired session related information is session related information in the session establishment process. The configuration unit is configured to: perform user plane configuration by using the session related information. Correspondingly, the first related information is GTP transmission channel configuration information transmitted by the local user plane data, and the second related information is GTP transmission channel configuration information transmitted by the local user plane data of the second network element corresponding to the first related information.

In the foregoing solution, the acquired session related information is session related information in the session modification process. The configuration unit is configured to: modify the user plane configuration by using the session related information. Correspondingly, the first related information is GTP transmission channel configuration modification information transmitted by the local user plane data, and the second related information is GTP transmission channel configuration modification information transmitted by the local user plane data of the second network element corresponding to the first related information.

In the foregoing solution, the acquired session related information is session related information in the session deletion process. The configuration unit is configured to: delete a GTP transmission channel configuration by using the session related information. Correspondingly, the first related information is GTP transmission channel configuration deletion information transmitted by the local user plane data, and the second related information is GTP transmission channel configuration deletion acknowledgement information transmitted by the local user plane data of the second network element corresponding to the first related information.

In the foregoing solution, the transmission unit is configured to: directly send the first related information to the second network element; and receive the second related information directly sent by the second network element.

In the foregoing solution, the transmission unit is configured to: forward the first related information to the second network element through the CU-C; and receive the second related information sent by the second network element and forwarded by the CU-C.

An embodiment of the present disclosure also provides an apparatus for configuring a GTP transmission channel. The apparatus includes a second acquiring unit and a sending unit.

The second acquiring unit is configured to acquire session related information from a core network.

The sending unit is configured to send the session related information to a CU-U responsible for user plane data in a first network element through an Xn interface, where the session related information is used by the CU-U to perform a GTP transmission channel configuration, and the Xn interface is used for interaction between the CU-U and a CU-C responsible for control plane data in the first network element.

In the foregoing solution, the second acquiring unit is specifically configured to: acquire the session related information from a core network through an NG interface, where the NG interface is used for interaction between the CU-C and the core network.

In the foregoing solution, the apparatus further includes: a receiving unit configured to receive first related information of a local GTP transmission channel configuration of the CU-U sent by the CU-U, and receive second related information of a local GTP transmission channel configuration of the second network element sent by the second network element.

The sending unit is configured to forward the first related information to a second network element, and forward the second related information to the CU-U.

An embodiment of the present disclosure also provides a storage medium, which stores computer programs for, when executed by a processor, implementing the above steps of any one method at the CU-U responsible for user plane data in the first network element, or the above steps of any one method at the CU-C responsible for control plane data in the first network element.

According to the method and apparatus for configuring a GTP transmission channel and the storage medium provided by the embodiments of the present disclosure, the CU-C acquires session related information from the core network, the CU-U acquires session related information through an Xn interface, the Xn interface being used for interaction between the CU-U and the CU-C, the CU-U performs a GTP transmission channel configuration by using the session related information, and transmits first related information of a local GTP transmission channel configuration to the second network element, and the CU-U receives second related information of a GTP transmission channel configuration transmitted by the second network element, so that the configuration of the GTP transmission channel between the CU-U and the DU is achieved through the Xn interface.

BRIEF DESCRIPTION OF DRAWINGS

In the drawings, which are not necessarily to scale, similar reference numerals may describe similar parts in different views. The drawings generally illustrate the various embodiments discussed herein by way of example instead of limitation.

DETAILED DESCRIPTION

The present disclosure will be further described in detail below with reference to the accompanying drawings and embodiments.

The interaction between the first network element and the second network element in the 5G system is first comprehended prior to describing the embodiments of the present disclosure.

For the first network element and the second network element, functions of a base station are virtually divided and performed by the first network element and the second network element. That is, the first network element is a logic node that implements part of the functions of the base station, and the second network element is a logic node that implements other functions except those implemented by the first network element, and the first network element can control the second network element.

Figure 1:
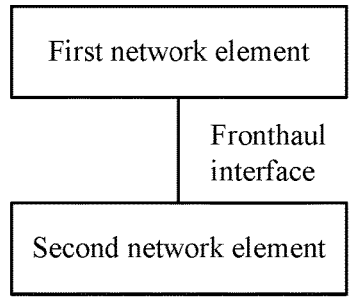
FIG. 1 is a schematic diagram of a fronthaul interface between a first network element and a second network element according to an embodiment of the present disclosure.

As shown in FIG. 1, information is exchanged between the first network element and the second network element through the fronthaul interface. For different delay requirements, the fronthaul interface may be an ideal fronthaul interface or a non-ideal fronthaul interface. The transmission delay of the ideal fronthaul interface is relatively small, such as about tens to hundreds of microseconds, and the transmission delay of the non-ideal fronthaul interface is relatively large, such as milliseconds, due to the distinction between ideal and non-ideal fronthaul interfaces, the first network element and the second network element have different functional divisions.

Figure 2:
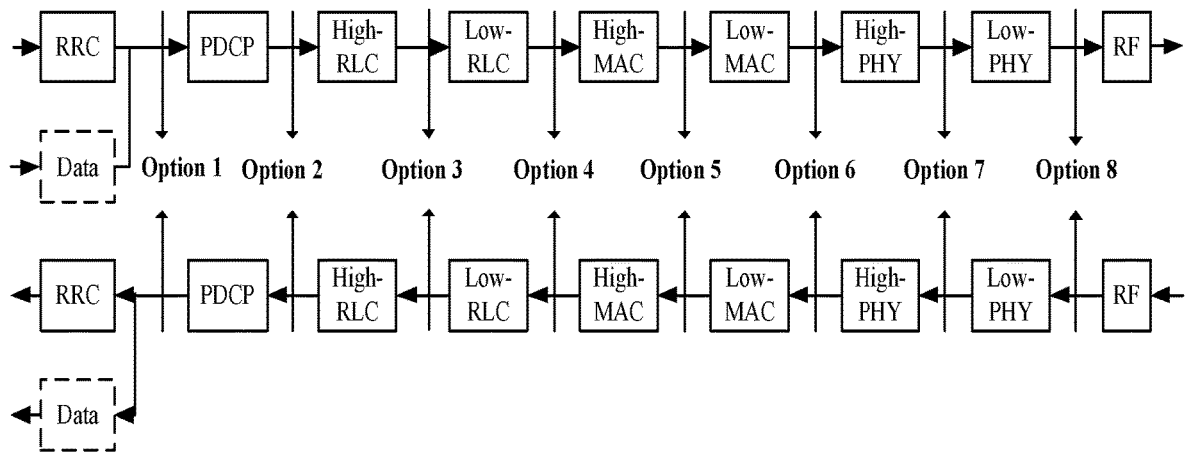
FIG. 2 is a schematic diagram of possible functional division between a first network element and a second network element according to an embodiment of the present disclosure.

FIG. 2 is a diagram illustrating possible functional division between the first network element and the second network element. Specific possible functional division solutions are as follows:

1. Option 1 (RRC/PDCP split):

In this functional split option, the RRC is located in the CU (i.e., the first network element), and functions such as PDCP, RLC, MAC, PHY, and RF are all located in the DU (i.e., the second network element). That is, the entire Upper (UP) function is located in the DU.

2. Option 2 (PDCP/RLC split):

In this functional split option, the RRC and the PDCP are located in the CU, and functions such as RLC, MAC, PHY, and RF are all located in the DU.

3. Option 3 (High RLC/Low RLC split):

In this functional split option, low-layer RLC (part of the function of the RLC), MAC, PHY, and a part of RF are located in the DU, and functions such as PDCP and high-layer RLC (part of the functions of the RLC) are located in the CU.

4. Option 4 (RLC-MAC split):

In this functional split option, MAC, PHY, and part of RF are located in the DU, and functions such as PDCP and RLC are all located in the CU.

5. Option 5 (Intra MAC split):

In this functional split option, part of the functions of the MAC (such as Hybrid Automatic Repeat Request (HARQ)), PHY and part of RF are located in the DU, and other UP functions are located in the CU.

6. Option 6 (MAC-PHY split):

In this functional split option, MAC, PHY, and part of RF are located in the DU, and functions such as PDCP and RLC are all located in the CU.

7. Option 7 (Intra PHY split):

In this functional split option, part of the functions of the MAC (such as HARQ), PHY and part of RF are located in the DU, and other UP functions are located in the CU.

8. Option 8 (PHY-RF split):

In this functional split option, part of RF is located in the DU, and other UP functions are all located in the CU.

Figure 3:
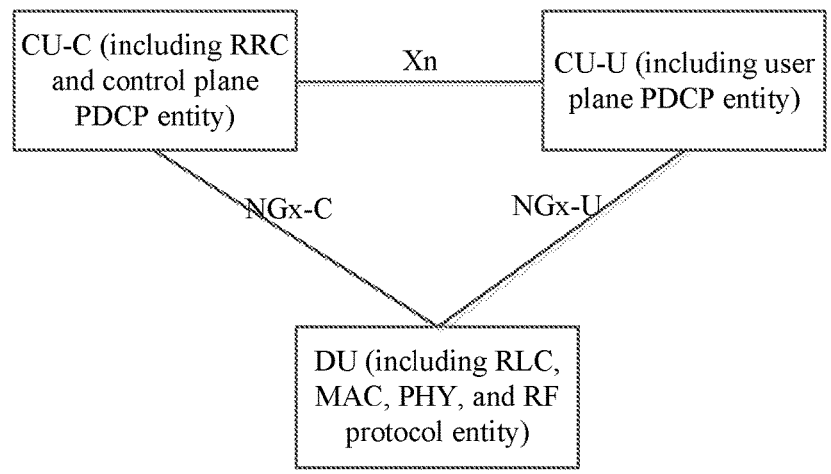
FIG. 3 is a schematic diagram showing split of control plane data and user plane data of a first network element according to an embodiment of the present disclosure.

FIG. 3 is a schematic diagram showing split of user plane data and control plane data of the first network element. As shown in FIG. 3, two PDCPs of the user plane and the control plane are respectively located in two different CUs. For the sake of description, the two CUs are respectively referred to as a CU-U and a CU-C, thereby realizing split of user plane data and control plane data. An Xn interface exists between the CU-C and the CU-U. A forward interface NGx exists between the CU and the DU. The interface between the CU-C and the DU is called NGx-C, and the interface between the CU-U and the DU is called NGx-U.

In various embodiments of the present disclosure, acquiring, by the CU-U, session related information through an Xn interface, the Xn interface being an interface between the CU-U and a Control Plane Centralized Unit (CU-C) responsible for control plane data in the first network element, performing a GTP transmission channel configuration by using the session related information, transmitting first related information of a local GTP transmission channel configuration to a second network element, and receiving second related information of a GTP transmission channel configuration transmitted by the second network element so as to complete the GTP transmission channel configuration.

Embodiment 1

Figure 4:
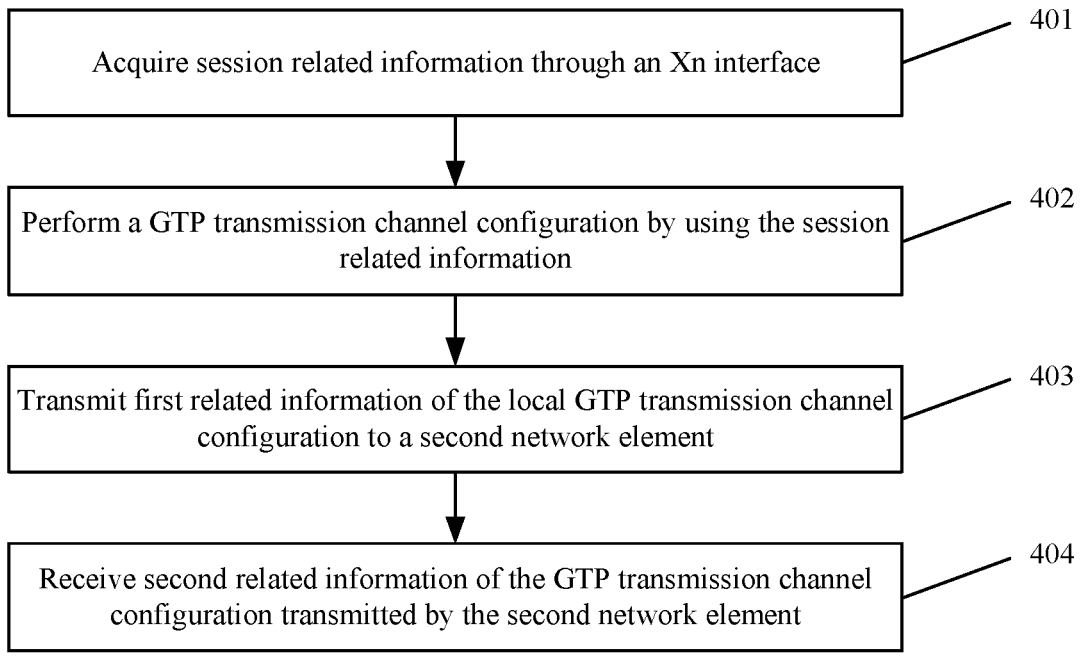
FIG. 4 is a schematic flowchart of a method for configuring a GTP transmission channel for a CU-U according to Embodiment 1 of the present disclosure.

An embodiment of the present disclosure provides a method for configuring a GTP transmission channel, applied to a CU-U responsible for user plane data in a first network element. As shown in FIG. 4, the method includes:

In step 401: Session related information is acquired through an Xn interface.

Here, the Xn interface is an interface between the CU-U and the CU-C responsible for control plane data in the first network element. That is, the Xn interface is used for interaction between the CU-U and the CU-C.

In other words, the CU-U acquires the session related information from the CU-C through the Xn interface.

Specifically, the session related information sent by the CU-C is received by the Xn interface.

The specific content of the session related information is slightly different according to different application scenarios.

Specifically, when the session related information is session related information in the session establishment process, the session related information includes GTP channel information and PDU session information required for establishing a current Protocol Data Unit (PDU) session.

When the session related information is session related information in the session modification process, the session related information includes GTP channel information and PDU session information required for modifying the current PDU session.

When the session related information is session related information in the session deletion process, the session related information includes information required for deleting the current PDU session.

In step 402: A GTP transmission channel configuration is performed by using the session related information.

Specifically, when the acquired session related information is session related information in the session establishment process, the user plane configuration is performed by using the session related information.

When the acquired session related information is session related information in the session modification process, the session related information is used to modify the user plane configuration.

When the acquired session related information is session related information in the session deletion process, the GTP transmission channel configuration is deleted by using the session related information.

In step 403: First related information of a local GTP transmission channel configuration is transmitted to a second network element.

In step 404: Second related information of a GTP transmission channel configuration transmitted by the second network element is received.

Here, when the acquired session related information is session related information in the session establishment process, the first related information is GTP transmission channel configuration information transmitted by local user plane data, and the second related information is the GTP transmission channel configuration information transmitted by the local user plane data of the second network element corresponding to the first related information.

When the acquired session related information is session related information in the session modification process, the first related information is GTP transmission channel configuration modification information transmitted by the local user plane data, and the second related information is the GTP transmission channel configuration modification information transmitted by the local user plane data of the second network element corresponding to the first related information.

When the acquired session related information is session related information in the session deletion process, the first related information is GTP transmission channel configuration deletion information transmitted by the local user plane data, and the second related information is the GTP transmission channel configuration deletion acknowledgement information transmitted by the local user plane data of the second network element corresponding to the first related information.

In practical applications, there are two implementation modes for the configuration of the GTP transmission channel between the CU-U and the DU: one mode is that the CU-U and the DU configure the GTP transmission channel by themselves, and the other mode is that the CU-C assists the CU-U and the DU in configuring the GTP transmission channel.

In the first mode, the specific implementation of step 403 includes: directly sending, by the CU-U, the first related information to the second network element.

Accordingly, the specific implementation of step 404 includes: receiving, by the CU-U, the second related information directly sent by the second network element.

In the second mode, the specific implementation of step 403 includes: forwarding, by the CU-U, the first related information to the second network element through the CU-C.

Accordingly, the specific implementation of step 404 includes: receiving, by the CU-U, the second related information sent by the second network element and forwarded by the CU-C.

Figure 5:
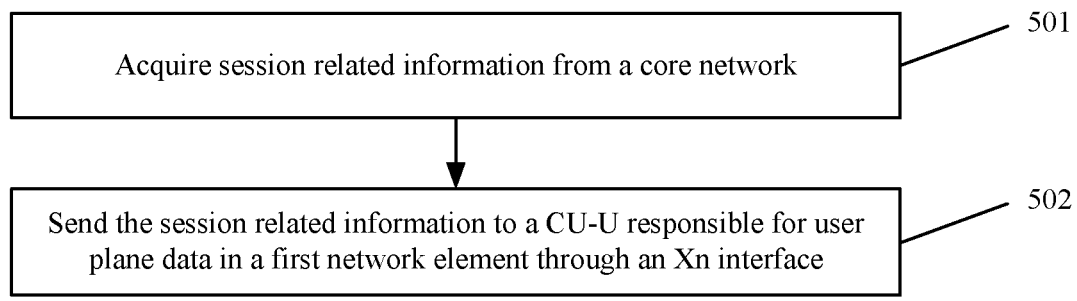
FIG. 5 is a schematic flowchart of a method for configuring a GTP transmission channel for a CU-C according to Embodiment 1 of the present disclosure.

Accordingly, an embodiment of the present disclosure also provides a method for configuring a GTP transmission channel, applied to the CU-C. As shown in FIG. 5, the method includes:

In step 501: Session related information is acquired from a core network.

Specifically, the CU-C acquires the session related information from the NG interface through the NG interface.

The NG interface is an interface between the core network and the CU-C, that is, the NG interface is used for interaction between the core network and the CU-C.

In step 502: The session related information is sent to a CU-U responsible for user plane data in a first network element through an Xn interface.

Here, the session related information is used by the CU-U to configure the GTP transmission channel, that is, steps 402-404 are executed.

In the process that the CU-C assists the CU-U and the DU in configuring the GTP transmission channel, the CU-C is required to participate in the forwarding of a message.

On this basis, in an embodiment, the method may also include: receiving, by the CU-C, first related information of a local GTP transmission channel configuration of the CU-U sent by the CU-U, and forwarding the first related information to a second network element; and receiving, by the CU-C, second related information of a local GTP transmission channel configuration of the second network element sent by the second network element, and forwarding the second related information to the CU-U.

Figure 6:
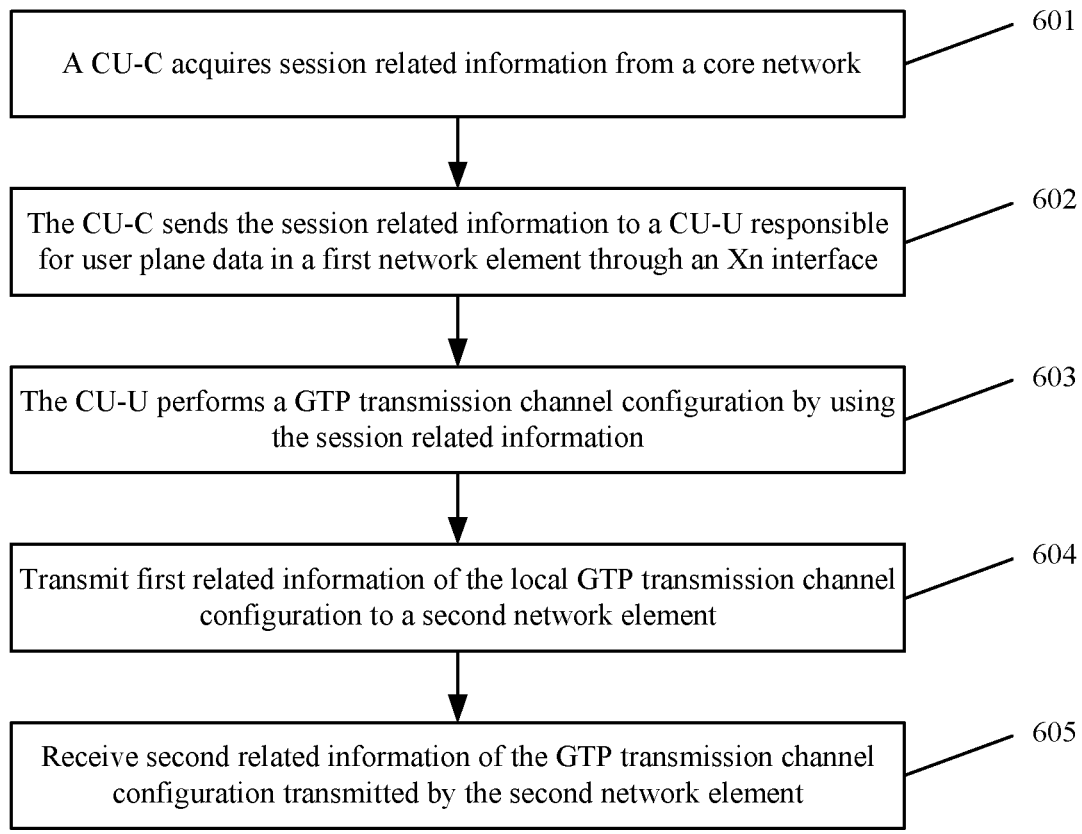
FIG. 6 is a schematic flowchart of a method for configuring a GTP transmission channel according to Embodiment 1 of the present disclosure.

An embodiment of the present disclosure also provides a method for configuring a GTP transmission channel. As shown in FIG. 6, the method includes:

In step 601: A CU-C acquires session related information from a core network.

In step 602: The CU-C sends the session related information to a CU-U responsible for user plane data in a first network element through an Xn interface.

In step 603: The CU-U performs GTP transmission channel configuration by using the session related information.

In step 604: The CU-U transmits first related information of the local GTP transmission channel configuration to a second network element.

In step 605: The CU-U receives second related information of the GTP transmission channel configuration transmitted by the second network element.

Here, it should be noted that the specific processing procedures of the CU-U and the CU-C are described in detail above, and details are not described herein.

The functions of the first network element and the second network element may be understood by referring to the foregoing description.

According to the method for configuring a GTP transmission channel provided by the embodiments of the present disclosure, the CU-C acquires session related information from the core network, the CU-U acquires session related information through an Xn interface, the Xn interface is used for interaction between the CU-U and the CU-C, the CU-U performs a GTP transmission channel configuration by using the session related information, and transmits first related information of a local GTP transmission channel configuration to the second network element, and the CU-U receives second related information of a GTP transmission channel configuration transmitted by the second network element, so that the configuration of the GTP transmission channel on an NG-U interface between the CU-U and the DU is achieved through the Xn interface, thereby implementing split of control signaling and user data, and supporting an independent user plane data transmission function while having the centralized RRC/Radio Resource Management (RRM) function.

Embodiment 2

Figure 7:
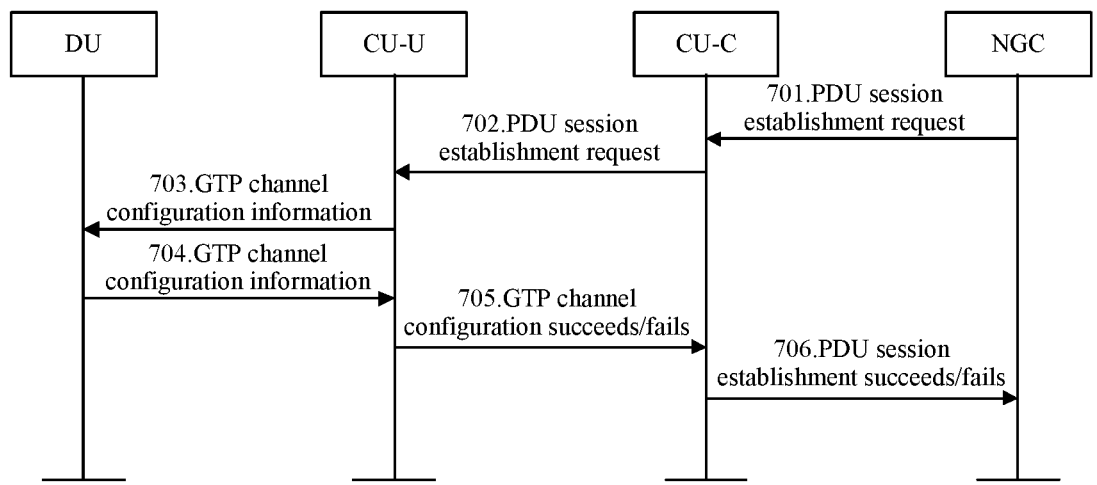
FIG. 7 is a schematic flowchart of a method for configuring a GTP transmission channel according to Embodiment 2 of the present disclosure.

On the basis of Embodiment 1, this embodiment describes the process in which the CU-U and the DU configure a GTP transmission channel when a PDU session is established. As shown in FIG. 7, the process includes:

In step 701: A Next Generation Core (NGC) sends a PDU session establishment request to a CU-C.

Here, the PDU session establishment request carries PDU session related information. That is, the CU-C acquires PDU session related information from the NGC through the PDU session establishment procedure of the NG interface.

The related information includes GTP channel information and PDU session information required for establishing a current PDU session.

Specifically, the related information includes, but is not limited to, one or more of the following information: transport layer address information of a core network UP Gateway (GW) (if the user plane transport layer adopts a GTP-U protocol, transport layer IP address information and a GTP Tunnel Endpoint Identifier (TEID) are included), a session ID, one or more flow IDs in a single session, QoS related information of a Non-GBR service corresponding to the flow, and QoS related information of a GBR service corresponding to the flow.

Further, if the GTP channel of the flow level is allowed to be established, transport layer address information of the core network UP GW corresponding to all flows in the current PDU session is included (if the user plane transport layer adopts the GTP-U protocol, the transport layer IP address information and the GTP TEID are included).

In step 702: After receiving the request, the CU-C sends a PDU session establishment request to a CU-U.

Here, the sent PDU session establishment request carries PDU session related information. That is, the CU-C transmits the PDU session related information acquired in step 1 to the CU-U through the Xn interface.

In step 703: After receiving the request, the CU-U sends GTP channel configuration information to a DU.

Specifically, after receiving the PDU session related information from the CU-C, the CU-U performs the user plane configuration and sends the GTP channel configuration information transmitted by the local user plane data to the DU through an interface message.

The sent GTP channel configuration information includes, but is not limited to, transport layer address information of the CU-U (if the user plane transport layer adopts the GTP-U protocol, the transport layer IP address information and the GTP TEID are included).

In actual application, the interaction between the CU-U and the DU may be implemented through an NGx AP message or a GTP message.

In step 704: After receiving the GTP channel configuration information sent by the CU-U, the DU feeds back its GTP channel configuration information to the CU-U through a response message.

Here, the fed-back GTP channel configuration information includes, but is not limited to, transport layer address information of the DU (if the user plane transport layer adopts the GTP-U protocol, the transport layer IP address information and the GTP TEID are included).

In step 705: After receiving the GTP channel configuration information of the DU, the CU-U feeds the PDU session information that the GTP channel configuration succeeds back to the CU-C.

Here, if the CU-U receives the GTP channel configuration information of the DU, it is indicated that the GTP channel configuration between the CU-U and the DU succeeds.

If the GTP channel configuration information of the DU is not received, it is indicated that the GTP channel configuration between the CU-U and the DU fails.

The fed-back PDU session information includes, but is not limited to, one or more of the following information: transport layer address information of the CU-U (if the user plane transport layer adopts the GTP-U protocol, the transport layer IP address information and the GTP TEID are included), a session ID, and one or more flow IDs that the user plane configuration succeeds in a single session.

When the GTP channel configuration between the CU-U and the DU fails, the fed-back PDU session information can include one or more flow IDs that the user plane configuration fails, and corresponding failure reasons.

In step 706: The CU-C sends a PDU session establishment success message to the NGC through the NG interface, and feeds the PDU session information that the GTP channel configuration succeeds back to the NGC.

Here, the PDU session information fed back to the NGC includes, but is not limited to, one or more of the following information: transport layer address information of the CU-U (if the user plane transport layer adopts the GTP-U protocol, the transport layer IP address information and the GTP TEID are included), a session ID, and one or more flow IDs that the user plane configuration succeeds in a single session.

When the GTP channel configuration between the CU-U and the DU fails, the PDU session information fed back to the NGC can include one or more flow IDs that the user plane configuration fails, and corresponding failure reasons.

Embodiment 3

Figure 8:
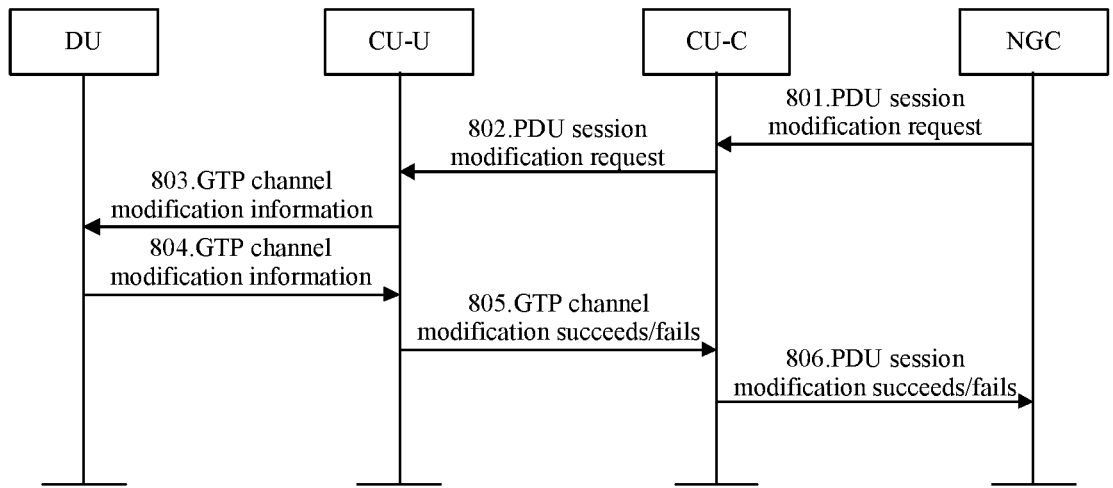
FIG. 8 is a schematic flowchart of a method for configuring a GTP transmission channel according to Embodiment 3 of the present disclosure.

On the basis of Embodiment 1, this embodiment describes the process in which the CU-U and the DU configure the GTP transmission channel when the PDU session is modified. As shown in FIG. 8, the process includes:

In step 801: An NGC sends a PDU session modification request to a CU-C.

Here, the PDU session modification request carries PDU session modification related information. That is, the CU-C acquires PDU session modification related information from the NGC through the PDU session modification procedure of an NG interface.

The related information includes GTP channel information and PDU session information required for modifying the current PDU session.

Specifically, the related information includes, but is not limited to, one or more of the following information: transport layer address information of the core network UP GW (if the user plane transport layer adopts the GTP-U protocol, the transport layer IP address information and the GTP TEID are included), a session ID, one or more flow IDs to be added in a single session, QoS related information of a Non-GBR service corresponding to the flow, QoS related information of a GBR service corresponding to the flow, one or more flow IDs to be modified in a single session, QoS related information of the Non-GBR service corresponding to the flow, QoS related information of the GBR service corresponding to the flow, and one or more flow IDs to be deleted in a single session.

In step 802: After receiving the request, the CU-C sends a PDU session modification request to a CU-U.

Here, the sent PDU session modification request carries the modified PDU session related information. That is, the CU-C transmits the modified PDU session related information to the CU-U through the PDU session modification procedure of an Xn interface.

The transmitted PDU session related information includes GTP channel information and PDU session information required for modifying the current PDU session.

In step 803: After receiving the request, the CU-U sends the GTP channel modification information to a DU.

Specifically, after receiving the modified PDU session related information from the CU-C, the CU-U performs modification (such as addition, modification, or deletion) on the user plane configuration, and sends the modified local GTP channel configuration modification information for user plane transmission to the DU through an interface message.

The sent GTP channel configuration modification information includes, but is not limited to, transport layer address information of the CU-U (if the user plane transport layer adopts the GTP-U protocol, the transport layer IP address information and the GTP TED are included).

In actual application, the interaction between the CU-U and the DU may be implemented through an NGx AP message or a GTP message.

In step 804: After receiving the GTP channel configuration modification information sent by the CU-U, the DU feeds back its GTP channel configuration modification information to the CU-U through a response message.

Here, the fed-back GTP channel configuration modification information includes, but is not limited to, transport layer address information of the DU (if the user plane transport layer adopts the GTP-U protocol, the transport layer IP address information and the GTP TED are included).

In step 805: After receiving the GTP channel configuration modification information of the DU, the CU-U feeds the PDU session information that the GTP channel configuration modification succeeds back to the CU-C.

Here, if the CU-U receives the GTP channel configuration modification information of the DU, it is indicated that the GTP channel configuration modification between the CU-U and the DU succeeds, and the CU-U feeds the PDU session information that the GTP channel configuration modification succeeds back to the CU-C.

The fed-back PDU session information includes, but is not limited to, one or more of the following information: transport layer address information of the CU-U (if the user plane transport layer adopts the GTP-U protocol, the transport layer IP address information and the GTP TEID are included), a session ID, and one or more flow IDs for user plane configuration modification in a single session.

When the GTP channel configuration modification between the CU-U and the DU fails, the fed-back PDU session information optionally includes one or more flow IDs that the user plane configuration modification fails, and corresponding failure reasons.

In step 806: The CU-C sends a PDU session modification success message to an NGC through an NG interface, and feeds the PDU session information that the GTP channel configuration modification succeeds back to the NGC.

Here, the PDU session information fed back to the NGC includes, but is not limited to, one or more of the following information: transport layer address information of the CU-U (if the user plane transport layer adopts the GTP-U protocol, the transport layer IP address information and the GTP TEID are included), a session ID, and one or more flow IDs that the user plane configuration succeeds in a single session.

When the GTP channel configuration modification between the CU-U and the DU fails, the PDU session information fed back to the NGC optionally includes one or more flow IDs that the user plane configuration fails, and corresponding failure reasons.

Embodiment 4

Figure 9:
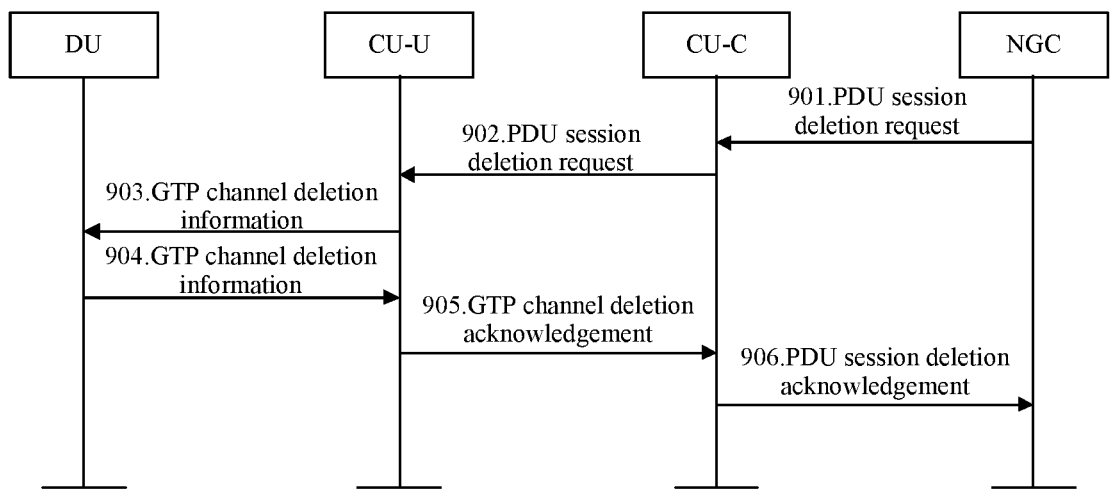
FIG. 9 is a schematic flowchart of a method for configuring a GTP transmission channel according to Embodiment 4 of the present disclosure.

On the basis of Embodiment 1, this embodiment describes the process in which the CU-U and the DU configure the GTP transmission channel when the PDU session is deleted. As shown in FIG. 9, the process includes:

In step 901: An NGC sends a PDU session deletion request to a CU-C.

Here, the PDU session deletion request carries PDU session related information. That is, the CU-C acquires PDU session related information from the NGC through the PDU session deletion procedure of the NG interface.

The related information includes information required for deleting the PDU session.

Specifically, the related information includes, but is not limited to, one or more of the following information: transport layer address information of the core network UP GW (if the user plane transport layer adopts the GTP-U protocol, the transport layer IP address information and the GTP TEID are included), a session ID, and reasons for session deletion.

In step 902: After receiving the request, the CU-C sends a PDU session deletion request to a CU-U.

Here, the sent PDU session deletion request carries information required for deleting the PDU session. That is, the CU-C transmits the information required for deleting the PDU session to the CU-U through the PDU session deletion procedure of the Xn interface.

The transmitted information required for deleting the PDU session includes, but is not limited to, one or more of the following information: transport layer address information of the core network UP GW (if the user plane transport layer adopts the GTP-U protocol, the transport layer IP address information and the GTP TED are included), a session ID, and reasons for session deletion.

In step 903: After the request is received, the GTP channel configuration deletion information is sent to a DU.

Specifically, after receiving the related information of deleting the PDU session, the CU-U deletes the corresponding local GTP channel configuration information, and sends the GTP channel configuration deletion information to the DU.

In step 904: After receiving the GTP channel configuration deletion information sent by the CU-U, the DU deletes the local GTP channel configuration information, and sends a GTP channel deletion acknowledgement message to the CU-U through a response message.

In step 905: After receiving the GTP channel deletion acknowledgement message from the DU, the CU-U sends a PDU session deletion success message to the CU-C.

Here, the sent message includes, but is not limited to, transport layer address information of the CU-U (if the user plane transport layer adopts the GTP-U protocol, the transport layer IP address information and the GTP TED are included).

In step 906: After receiving the PDU session deletion success message sent by the CU-U, the CU-C sends a PDU session deletion acknowledgement message to the NGC through the NG interface.

Embodiment 5

Figure 10:
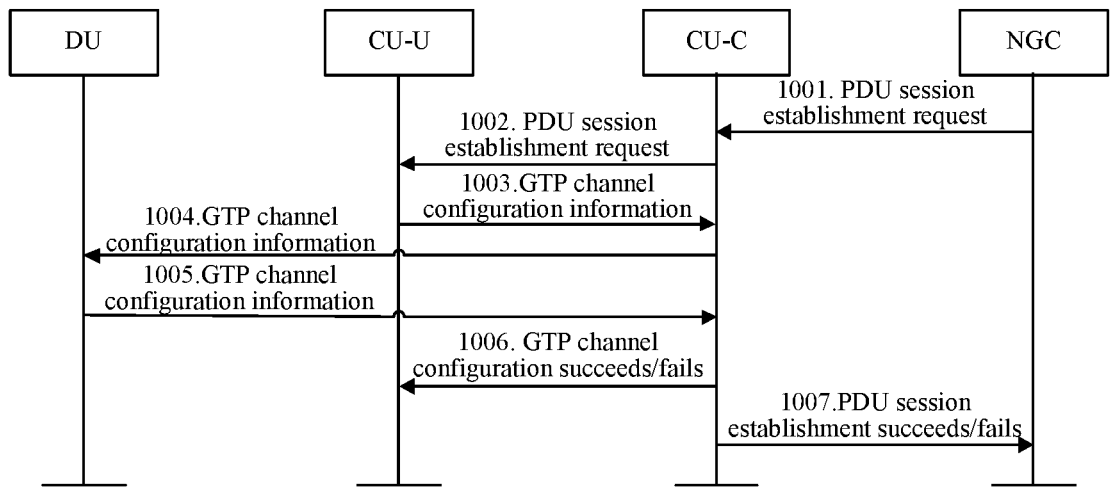
FIG. 10 is a schematic flowchart of a method for configuring a GTP transmission channel according to Embodiment 5 of the present disclosure.

On the basis of Embodiment 1, this embodiment describes the process in which the CU-C assists the CU-U and the DU in configuring a GTP transmission channel when a PDU session is established. As shown in FIG. 10, the process includes:

In step 1001: An NGC sends a PDU session establishment request to a CU-C.

Here, the PDU session establishment request carries PDU session related information. That is, the CU-C acquires PDU session related information from the NGC through the PDU session establishment procedure of the NG interface.

The related information includes GTP channel information and PDU session information required for establishing a current PDU session.

Specifically, the related information includes, but is not limited to, one or more of the following information: transport layer address information of a core network UP GW (if the user plane transport layer adopts a GTP-U protocol, transport layer IP address information and a GTP TEID are included), a session ID, one or more flow IDs in a single session, QoS related information of a Non-GBR service corresponding to the flow, and QoS related information of a GBR service corresponding to the flow.

Further, if the GTP channel of the flow level is allowed to be established, transport layer address information of the core network UP GW corresponding to all flows in the current PDU session is included (if the user plane transport layer adopts the GTP-U protocol, the transport layer IP address information and the GTP TEID are included).

In step 1002: After receiving the request, the CU-C sends a PDU session establishment request to a CU-U.

Here, the sent PDU session establishment request carries PDU session related information. That is, the CU-C transmits the PDU session related information acquired in step 1001 to the CU-U through an Xn interface.

In step 1003: After receiving the request, the CU-U sends the GTP channel configuration information to the CU-C.

Specifically, the CU-U completes the local user plane configuration according to the received Xn interface message, and sends the locally allocated GTP channel configuration information to the CU-C through a response message.

The sent GTP channel configuration information includes, but is not limited to, transport layer address information of the CU-U (if the user plane transport layer adopts the GTP-U protocol, the transport layer IP address information and the GTP TEID are included).

In step 1004: After receiving the GTP channel configuration information from the CU-U, the CU-C sends the configuration information to the DU.

Here, the sent GTP channel configuration information includes, but is not limited to, transport layer address information of the CU-U (if the user plane transport layer adopts the GTP-U protocol, the transport layer IP address information and the GTP TEID are included).

In step 1005: After receiving the GTP channel configuration information about the CU-U forwarded by the CU-C, the DU feeds back its GTP channel configuration information to the CU-C.

Here, the GTP channel configuration information fed back to the CU-C includes, but is not limited to, transport layer address information of the DU (if the user plane transport layer adopts the GTP-U protocol, the transport layer IP address information and the GTP TEID are included).

In step 1006: After receiving the GTP channel configuration information from the DU, the CU-C feeds back the GTP channel configuration information from the DU to the CU-U to complete GTP channel configuration.

Here, if the CU-U receives the GTP channel configuration information of the DU, it is indicated that the GTP channel configuration between the CU-U and the DU succeeds, and in this case, the CU-C feeds back the GTP channel configuration modification information of the DU to the CU-U through a GTP channel configuration success message.

If the GTP channel configuration information of the DU is not received, it is indicated that the GTP channel configuration between the CU-U and the DU fails, and in this case, the CU-C sends a GTP channel configuration failure message and corresponding failure reasons to the CU-U.

In step 1007: The CU-C sends a PDU session establishment success message to an NGC through an NG interface, and feeds the PDU session information that the GTP channel configuration succeeds back to the NGC.

Here, the PDU session information fed back to the NGC includes, but is not limited to, one or more of the following information: transport layer address information of the CU-U (if the user plane transport layer adopts the GTP-U protocol, the transport layer IP address information and the GTP TEID are included), a session ID, and one or more flow IDs that the user plane configuration succeeds in a single session.

When the GTP channel configuration between the CU-U and the DU fails, the PDU session information fed back to the NGC optionally includes one or more flow IDs that the user plane configuration fails, and corresponding failure reasons.

Embodiment 6

Figure 11:
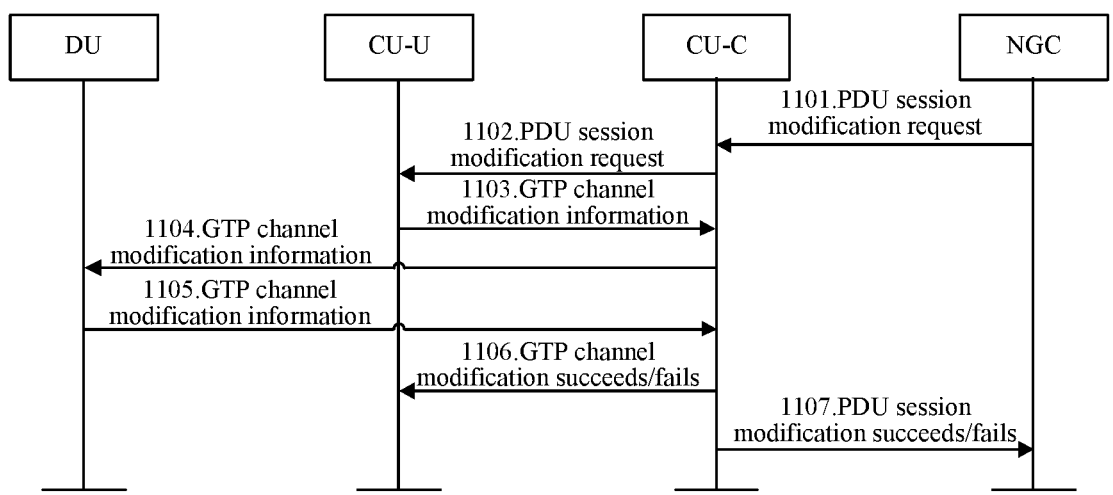
FIG. 11 is a schematic flowchart of a method for configuring a GTP transmission channel according to Embodiment 6 of the present disclosure.

On the basis of Embodiment 1, this embodiment describes the process in which the CU-C assists the CU-U and the DU in configuring a GTP transmission channel when the PDU session is modified. As shown in FIG. 11, the process includes:

In step 1101: An NGC sends a PDU session modification request to a CU-C.

Here, the PDU session modification request carries PDU session modification related information. That is, the CU-C acquires PDU session modification related information from the NGC through the PDU session modification procedure of an NG interface.

The related information includes GTP channel information and PDU session information required for modifying the current PDU session.

Specifically, the related information includes, but is not limited to, one or more of the following information: transport layer address information of the core network UP GW (if the user plane transport layer adopts the GTP-U protocol, the transport layer IP address information and the GTP TEID are included), a session ID, one or more flow IDs to be added in a single session, QoS related information of a Non-GBR service corresponding to the flow, QoS related information of a GBR service corresponding to the flow, one or more flow IDs to be modified in a single session, QoS related information of the Non-GBR service corresponding to the flow, QoS related information of the GBR service corresponding to the flow, and one or more flow IDs to be deleted in a single session.

In step 1102: After receiving the request, the CU-C sends a PDU session modification request to a CU-U.

Here, the sent PDU session modification request carries the modified PDU session related information. That is, the CU-C transmits the modified PDU session related information to the CU-U through the PDU session modification procedure of an Xn interface.

The transmitted PDU session related information includes GTP channel information and PDU session information required for modifying the current PDU session.

In step 1103: After receiving the request, the CU-U sends GTP channel configuration information to the CU-C.

Specifically, after receiving the modified PDU session related information from the CU-C, the CU-U performs modification (such as addition, modification, or deletion) on the user plane configuration, and sends the modified local GTP channel configuration modification information for user plane transmission to the CU-C through an interface message.

The sent GTP channel configuration modification information includes, but is not limited to, transport layer address information of the CU-U (if the user plane transport layer adopts the GTP-U protocol, the transport layer IP address information and the GTP TED are included).

In step 1104: After receiving the GTP channel configuration modification information from the CU-U, the CU-C forwards the GTP channel configuration modification information to the DU.

Here, the GTP channel configuration modification information sent to the DU includes, but is not limited to, transport layer address information of the CU-U (if the user plane transport layer adopts the GTP-U protocol, the transport layer IP address information and the GTP TEID are included).

In step 1105: After receiving the GTP channel configuration modification information about the CU-U forwarded by the CU-C, the DU feeds back its GTP channel configuration modification information to the CU-C.

Here, the fed-back GTP channel configuration modification information includes, but is not limited to, transport layer address information of the DU (if the user plane transport layer adopts the GTP-U protocol, the transport layer IP address information and the GTP TED are included).

In step 1106: After receiving the GTP channel configuration modification information from the DU, the CU-C feeds back the GTP channel configuration modification information from the DU to the CU-U to complete GTP channel configuration modification.

Here, if the CU-U receives the GTP channel configuration information of the DU, it is indicated that the GTP channel configuration between the CU-U and the DU succeeds, and in this case, the CU-C feeds back the GTP channel configuration modification information of the DU to the CU-U through a GTP channel configuration modification success message.

If the CU-C fails to receive the GTP channel configuration modification information from the DU, a GTP channel configuration failure message and corresponding failure reasons are sent to the CU-U.

In step 1107: The CU-C sends a PDU session modification success message to an NGC through an NG interface, and feeds the PDU session information that the GTP channel configuration modification succeeds back to the NGC.

Here, the PDU session information fed back to the NGC includes, but is not limited to, one or more of the following information: transport layer address information of the CU-U (if the user plane transport layer adopts the GTP-U protocol, the transport layer IP address information and the GTP TEID are included), a session ID, and one or more flow IDs that the user plane configuration succeeds in a single session.

When the GTP channel configuration modification between the CU-U and the DU fails, the PDU session information fed back to the NGC optionally includes one or more flow IDs that the user plane configuration fails, and corresponding failure reasons.

Embodiment 7

Figure 12:
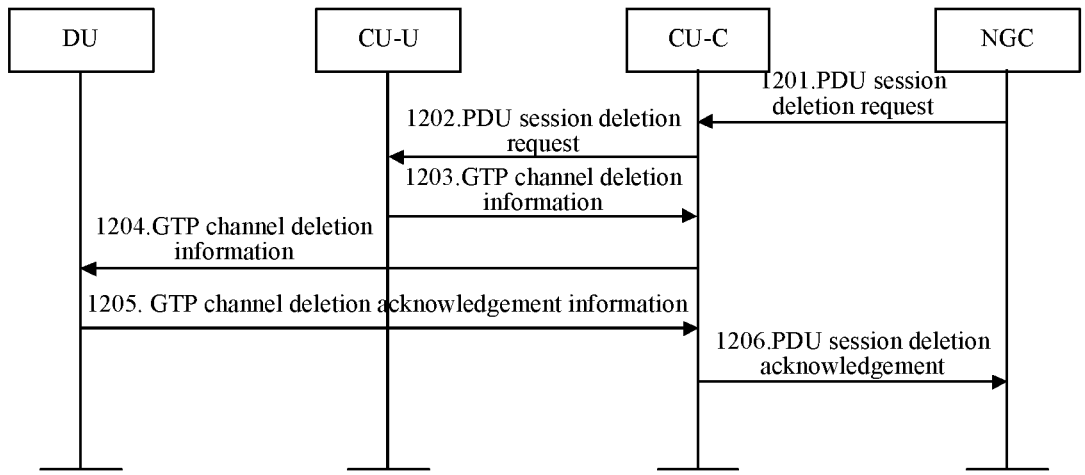
FIG. 12 is a schematic flowchart of a method for configuring a GTP transmission channel according to Embodiment 7 of the present disclosure.

On the basis of Embodiment 1, this embodiment describes the process in which the CU-C assists the CU-U and the DU in configuring a GTP transmission channel when a PDU session is deleted. As shown in FIG. 12, the process includes:

In step 1201: An NGC sends a PDU session deletion request to a CU-C.

Here, the PDU session deletion request carries PDU session related information. That is, the CU-C acquires PDU session related information from the NGC through the PDU session deletion procedure of an NG interface.

The related information includes information required for deleting the PDU session.

Specifically, the related information includes, but is not limited to, one or more of the following information: transport layer address information of the core network UP GW (if the user plane transport layer adopts the GTP-U protocol, the transport layer IP address information and the GTP TED are included), a session ID, and reasons for session deletion.

In step 1202: After receiving the request, the CU-C sends a PDU session deletion request to a CU-U.

Here, the sent PDU session deletion request carries information required for deleting the PDU session. That is, the CU-C transmits the information required for deleting the PDU session to the CU-U through the PDU session deletion procedure of an Xn interface.

The transmitted information required for deleting the PDU session includes, but is not limited to, one or more of the following information: transport layer address information of the core network UP GW (if the user plane transport layer adopts the GTP-U protocol, the transport layer IP address information and the GTP TED are included), a session ID, and reasons for session deletion.

In step 1203: After the request is received by the CU-C, GTP channel configuration deletion information is sent to the CU-C.

Specifically, after receiving the related information of deleting the PDU session, the CU-U deletes the corresponding local GTP channel configuration information, and sends the GTP channel configuration deletion information to the CU-C.

The sent GTP channel configuration deletion information includes, but is not limited to, transport layer address information of the CU-U (if the user plane transport layer adopts the GTP-U protocol, the transport layer IP address information and the GTP TED are included).

In step 1204: After receiving the GTP channel configuration deletion information from the CU-U, the CU-C forwards the GTP channel configuration deletion information to the DU.

In step 1205: After receiving the GTP channel configuration deletion information about the CU-U forwarded by the CU-C, the DU deletes the corresponding local GTP channel configuration information, and sends a GTP channel configuration deletion acknowledgement message to the CU-U through a response message.

In step 1206: After receiving the GTP channel configuration deletion acknowledgement message from the DU, the CU-C sends a PDU session deletion acknowledgement message to an NGC through an NG interface.

Embodiment 8

Figure 13:
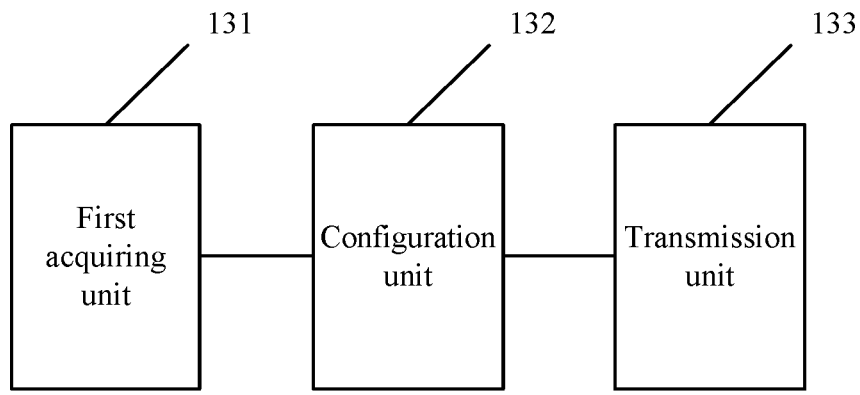
FIG. 13 is a schematic structural diagram of an apparatus for configuring a GTP transmission channel disposed at a CU-U according to Embodiment 8 of the present disclosure.

To implement the method of the embodiments of the present disclosure, this embodiment provides an apparatus for configuring a GTP transmission channel, which is disposed in a CU-U responsible for user plane data in a first network element. As shown in FIG. 13, the apparatus includes: a first acquiring unit 131, a configuration unit 132, and a transmission unit 133.

The first acquiring unit 131 is configured to acquire session related information through an Xn interface, where the Xn interface is an interface between the CU-U and a CU-C responsible for control plane data in a first network element, that is, the Xn interface is used for interaction between the CU-U and the CU-C;

The configuration unit 132 is configured to perform a GTP transmission channel configuration by using the session related information.

The transmission unit 133 is configured to transmit first related information of a local GTP transmission channel configuration to a second network element, and receive second related information of a GTP transmission channel configuration transmitted by the second network element.

When the acquired session related information is session related information in the session establishment process, the configuration unit 132 is configured to: perform user plane configuration by using the session related information. The first related information is GTP transmission channel configuration information transmitted by the local user plane data, and the second related information is GTP transmission channel configuration information transmitted by the local user plane data of the second network element corresponding to the first related information.

When the acquired session related information is session related information in the session modification process, the configuration unit 132 is configured to: modify the user plane configuration by using the session related information. Correspondingly, the first related information is GTP transmission channel configuration modification information transmitted by the local user plane data, and the second related information is GTP transmission channel configuration modification information transmitted by the local user plane data of the second network element corresponding to the first related information.

When the acquired session related information is session related information in the session deletion process, the configuration unit 132 is configured to: delete GTP transmission channel configuration by using the session related information. Correspondingly, the first related information is GTP transmission channel configuration deletion information transmitted by the local user plane data, and the second related information is GTP transmission channel configuration deletion acknowledge information transmitted by the local user plane data of the second network element corresponding to the first related information.

In practical applications, there are two implementation modes for the configuration of the GTP transmission channel between the CU-C and the DU: one mode is that the CU-U and the DU configure the GTP transmission channel by themselves, and the other mode is that the CU-C assists the CU-U and the DU in configuring the GTP transmission channel.

In the first mode, the transmission unit 133 is configured to: directly send the first related information to the second network element; and receive the second related information directly sent by the second network element.

In the second mode, the transmission unit 133 is configured to: forward the first related information to the second network element through the CU-C; and receive the second related information sent by the second network element and forwarded by the CU-C.

In practical applications, the first acquiring unit 131 and the transmission unit 133 may be implemented by a communication interface in a configuration apparatus of a GTP transmission channel. The configuration unit 132 may be implemented by a controller (such as a Central Processing Unit (CPU), a Micro Control Unit (MCU), a Digital Signal Processor (DSP), or a Field-Programmable Gate Array (FPGA)) in the configuration apparatus of the GTP transmission channel.

In addition, those skilled in the art should understand that the implementation functions of units in the apparatus shown in FIG. 13 may be understood with reference to the related description of the foregoing method.

Figure 14:
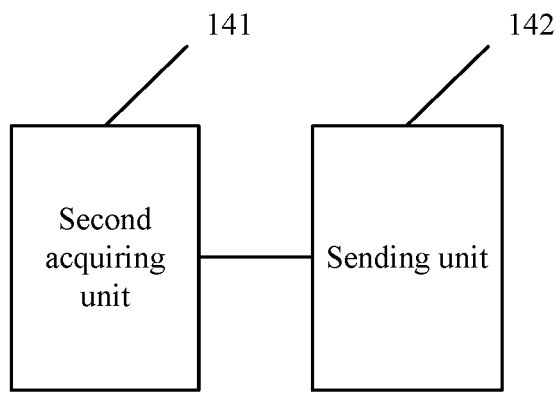
FIG. 14 is a schematic structural diagram of an apparatus for configuring a GTP transmission channel disposed at a CU-C according to Embodiment 8 of the present disclosure.

To implement the method of the embodiments of the present disclosure, this embodiment also provides an apparatus for configuring a GTP transmission channel, which is disposed in a CU-C responsible for control plane data in a first network element. As shown in FIG. 14, the apparatus includes: a second acquiring unit 141 and a sending unit 142.

The second acquiring unit 141 is configured to acquire session related information from a core network.

The sending unit 142 is configured to send the session related information to a CU-U responsible for user plane data in a first network element through an Xn interface, where the session related information is used by the CU-U to perform a GTP transmission channel configuration.

The second acquiring unit 141 is configured to: acquire the session related information from a core network through an NG interface.

The NG interface is an interface between the core network and the CU-C, that is, the NG interface is used for interaction between the core network and the CU-C.

In the process that the CU-C assists the CU-U and the DU in configuring the GTP transmission channel, the CU-C is required to participate in the forwarding of a message.

On this basis, in an embodiment, the apparatus may also include a receiving unit.

The receiving unit is configured to receive first related information of a local GTP transmission channel configuration of the CU-U sent by the CU-U, and receive second related information of a local GTP transmission channel configuration of the second network element sent by the second network element.

The sending unit 142 is configured to forward the first related information to a second network element, and forward the second related information to the CU-U.

In practical applications, the second acquiring unit 141, the transmission unit 142, and the receiving unit may be implemented by a communication interface in the apparatus for configuring a GTP transmission channel in combination with a processor.

In addition, those skilled in the art should understand that the implementation functions of units in the apparatus shown in FIG. 14 may be understood with reference to the related description of the foregoing method.

Figure 15:
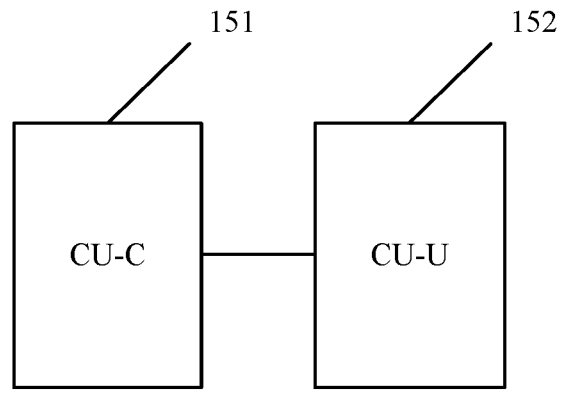
FIG. 15 is a schematic structural diagram of a system for configuring a GTP transmission channel according to Embodiment 8 of the present disclosure.

To implement the method of the embodiments of the present disclosure, this embodiment also provides a system for configuring a GTP transmission channel. As shown in FIG. 15, the system includes: a CU-C 151 and a CU-U 152.

The CU-C 151 is configured to acquire session related information from a core network, and send the session related information to the CU-U 152 through an Xn interface.

The CU-U 152 is configured to acquire the session related information through the Xn interface, perform GTP transmission channel configuration by using the session related information, transmit first related information of the local GTP transmission channel configuration to a second network element, and receive second related information of the GTP transmission channel configuration transmitted by the second network element.

Here, it should be noted that the specific functions of the CU-U 152 and the CU-C 151 are described in detail above, and details are not described herein.

Figure 16:
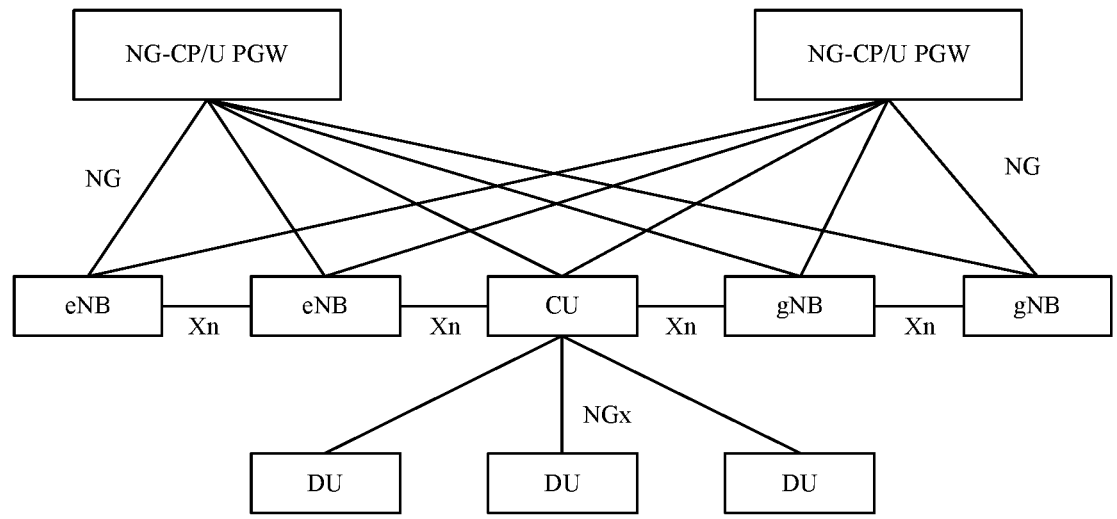
FIG. 16 is a schematic diagram of an application scenario of a solution according to an embodiment of the present disclosure.

An application scenario to which the embodiments of the present disclosure may be applied is an application scenario in which a Long Term Evolution (LTE) evolved NodeB (eNB) and a 5G NodeB (gNB) coexist, as shown in FIG. 16. In this scenario, the involved network elements include: an eNB, a gNB, and a core network (NG-CP/UP GW). The first network element (CU) is connected to the eNB and the gNB through an Xn interface. The second network element (DU) may be directly connected to a terminal (UE). The core network and the eNB are connected through an NG interface. The core network and the gNBs are also connected through the NG interface. The gNB may be divided into two logic nodes: the CU and the DU. In this scenario, the CU may be divided into a CU-U and a CU-C, so that the solution of the embodiment of the present disclosure may be directly implemented.

For the network element shown in FIG. 16, in order to implement the functions of the network element, corresponding hardware device components may include a processor, a memory, a communication interface, etc.

Those skilled in the art should understand that embodiments of the present disclosure may be provided as methods, systems, or computer program products. Accordingly, the present disclosure may take the form of a hardware embodiment, a software embodiment, or a combination of embodiments in respect of software and hardware. Moreover, the present disclosure may take the form of a computer program product implemented on one or more computer available storage media (including but not limited to a disk memory, an optical memory, etc.) including computer available program codes.

The present disclosure is described with reference to flowchart illustrations and/or block diagrams of methods, devices (systems), and computer program products according to embodiments of the present disclosure. It should be understood that each flow and/or block in the flowchart and/or block diagram as well as a combination of flows and/or blocks in the flowchart and/or block diagram are implemented by computer program instructions. These computer program instructions may be provided to a processor of a general-purpose computer, a special-purpose computer, an embedded processor, or other programmable data processing device to produce a machine, so that instructions executed by the processor of a computer or other programmable data processing device produce an apparatus for implementing the functions specified in one or more flows of the flowchart and/or in one or more blocks of the block diagram.

These computer program instructions may also be stored in a computer readable memory that may direct the computer or the other programmable data processing device to operate in a particular manner, so that the instructions stored in the computer readable memory produce a product including an instruction apparatus. The instruction apparatus implements the functions specified in one or more flows of the flowchart and/or one or more blocks of the block diagram.

These computer program instructions may also be loaded onto the computer or the other programmable data processing device so that a series of operational steps are performed on the computer or the other programmable device to produce computer-implemented processing, and thus the instructions executed on the computer or the other programmable device provide steps for implementing the functions specified in one or more flows of the flowchart and/or one or more blocks of the block diagram.

On this basis, an embodiment of the present disclosure also provides a storage medium, specifically a computer readable storage medium storing computer programs which, when executed by a processor, implement the above steps of any one method at the CU-U responsible for user plane data in the first network element, or the above steps of any one method at the CU-C responsible for control plane data in the first network element.

The above are merely embodiments of the present disclosure, and are not intended to limit the scope of protection of the present disclosure.

INDUSTRIAL APPLICABILITY

According to the solutions provided by the embodiments of the present disclosure, the CU-C acquires session related information from the core network, the CU-U acquires session related information through an Xn interface, the Xn interface is used for interaction between the CU-U and the CU-C, the CU-U performs a GTP transmission channel configuration by using the session related information, and transmits first related information of a local GTP transmission channel configuration to the second network element, and the CU-U receives second related information of a GTP transmission channel configuration transmitted by the second network element, so that the configuration of the GTP transmission channel between the CU-U and the DU is achieved through the Xn interface.

What is claimed is:

1. A method for configuring a GPRS Tunneling Protocol (GTP) transmission channel, comprising:
   acquiring Protocol Data Unit (PDU) session related information through an Xn interface, wherein the Xn interface is used for interaction between a 5G NodeB User Plane Centralized Unit (gNB-CU-U) responsible for user plane data in a first network element and a 5G NodeB Control Plane Centralized Unit (gNB-CU-C) responsible for control plane data in the first network element;
   performing a local GTP transmission channel configuration by using the PDU session related information;
   transmitting, by the gNB-CU-C of the first network element, first related information of the local GTP transmission channel configuration to a second network element; and
   receiving second related information of a GTP transmission channel configuration transmitted by the second network element corresponding to the first related information.

2. The method of claim 1, wherein the step of transmitting first related information of the local GTP transmission channel configuration to a second network element comprises:
   forwarding the first related information to the second network element through the gNB-CU-C;
   correspondingly, the step of receiving second related information of a GTP transmission channel configuration transmitted by the second network element comprises:
   receiving the second related information sent by the second network element and forwarded by the gNB-CU-C.

3. A method for configuring a GTP transmission channel, comprising:
   acquiring Protocol Data Unit (PDU) session related information from a core network; and
   sending the PDU session related information to a 5G NodeB User Plane Centralized Unit (gNB-CU-U) responsible for user plane data in a first network element through an Xn interface, wherein the PDU session related information is used by the gNB-CU-U to perform a GTP transmission channel configuration, and the Xn interface is used for interaction between the gNB-CU-U and a 5G NodeB Control Plane Centralized Unit (gNB-CU-C) responsible for control plane data in the first network element.

4. The method of claim 3, further comprising:
   receiving first related information of a local GTP transmission channel configuration of the gNB-CU-U sent by the gNB-CU-U, and forwarding the first related information to a second network element; and
   receiving second related information of a local GTP transmission channel configuration of the second network element sent by the second network element, and forwarding the second related information to the gNB-CU-U.

5. An apparatus for configuring a GTP transmission channel, comprising a processor configured to:
   acquire Protocol Data Unit (PDU) session related information through an Xn interface, wherein the Xn interface is used for interaction between a 5G NodeB User Plane Centralized Unit (gNB-CU-U) responsible for user plane data in a first network element and a 5G NodeB Control Plane Centralized Unit (gNB-CU-C) responsible for control plane data in the first network element;

perform a local GTP transmission channel configuration by using the PDU session related information; and transmit, by the gNB-CU-C of the first network element, first related information of the local GTP transmission channel configuration to a second network element, and receive second related information of a GTP transmission channel configuration transmitted by the second network element corresponding to the first related information.

6. The apparatus of claim 5, wherein the processor is further configured to: forward the first related information to the second network element through the gNB-CU-C; and correspondingly, receive the second related information sent by the second network element and forwarded by the gNB-CU-C.

7. An apparatus for configuring a GTP transmission channel, the apparatus comprising a processor configured to acquire Protocol Data Unit (PDU) session related information from a core network, wherein the session related information includes GTP channel information and Protocol Data Unit (PDU) session information; and send the PDU session related information to a 5G NodeB User Plane Centralized Unit (gNB-CU-U) responsible for user plane data in a first network element through an Xn interface, wherein the PDU session related information is used by the gNB-CU-U to perform a GTP transmission channel configuration, and the Xn interface is used for interaction between the gNB-CU-U and a 5G NodeB Control Plane Centralized Unit (gNB-CU-C) responsible for control plane data in the first network element.

8. The apparatus of claim 7, wherein the processor is further configured to:

receive first related information of a local GTP transmission channel configuration of the gNB-CU-U sent by the gNB-CU-U, and forward the first related information to a second network element; and receive second related information of a local GTP transmission channel configuration of the second network element sent by the second network element, and forward the second related information to the gNB-CU-U.

* * * * *